(12) United States Patent
Robertson et al.

(10) Patent No.: US 12,703,436 B2
(45) Date of Patent: Aug. 11, 2026

(54) TAILGATE CABLE SLACK PRETENSIONER

(71) Applicant: FCA US LLC, Auburn Hills, MI (US)

(72) Inventors: James A Robertson, White Lake, MI (US); Ronald Lazarevich, Shelby Township, MI (US); Gene Compton, Clinton Township, MI (US)

(73) Assignee: FCA US LLC, Auburn Hills, MI (US)

( * ) Notice: Subject to any disclaimer, the term of this patent is extended or adjusted under 35 U.S.C. 154(b) by 336 days.

(21) Appl. No.: 18/522,492

(22) Filed: Nov. 29, 2023

(65) Prior Publication Data

US 2025/0171089 A1 May 29, 2025

(51) Int. Cl.
*B62D 33/027* (2006.01)

(52) U.S. Cl.
CPC ................................ *B62D 33/0273* (2013.01)

(58) Field of Classification Search
CPC ... B62D 33/027; B62D 33/03; E05Y 2201/65; E05Y 2201/67; E05Y 2900/544; E05F 5/06
USPC ............ 296/57.1, 146.8, 106; 16/82; 49/396
See application file for complete search history.

(56) References Cited

U.S. PATENT DOCUMENTS

| | | | | |
|---|---|---|---|---|
| 6,951,358 | B1 | 10/2005 | Ousley et al. | |
| 7,093,876 | B2 | 8/2006 | Romig et al. | |
| 8,070,208 | B2 | 12/2011 | Zielinsky | |
| 8,075,038 | B2 | 12/2011 | Zielinsky | |
| 8,109,553 | B2 | 2/2012 | Zielinsky | |
| 9,587,421 | B1 * | 3/2017 | Harrison | E05F 15/70 |
| 11,661,120 | B2 * | 5/2023 | Robinson | B62D 33/0273 296/61 |
| 11,919,576 | B2 * | 3/2024 | R N | B62D 33/03 |
| 2015/0353147 | A1 | 12/2015 | Bernhardt | |

* cited by examiner

*Primary Examiner* — Amy R Weisberg
(74) *Attorney, Agent, or Firm* — Jeremy J. Klobucar

(57) ABSTRACT

A tailgate cable pretensioner includes a cable having at least one end having a terminal for securing to a vehicle or a tailgate. A pretensioner is on the other end of the cable. The pretensioner includes a fastener to secure it to the vehicle or the tailgate. The pretensioner takes up cable slack when the pretensioner is secured on the vehicle or the tailgate.

4 Claims, 2 Drawing Sheets

TAILGATE CABLE SLACK PRETENSIONER

FIELD

The present disclosure relates to vehicle and, more particularly, to tailgate cable pretensioner.

BACKGROUND

This section provides background information related to the present disclosure which is not necessarily prior art.

Vehicles with tailgates generally utilize a cable to enhance a securement of the tailgate with the truck bed or box as well as to position the tailgate in an open position. Some tailgates include cables on both sides. The cables sometime, due to the variance in the body system components stack up from left to right, have sag or have slack in the cable that is evident on one of the sides when the tailgate is open without force applied onto the tailgate. This gives an aesthetically unpleasing perception of the vehicle. While there is nothing wrong with the system or vehicle, the user perceives a quality issue in the appearance of a sagging cable. The sagging cable has caused warranty issues for the manufacturer where the buyer believes that this not normal and returns the vehicle to the dealer for repair. Thus, it is desirable to eliminate the perceived quality issues of sagging tailgate cables and the related warranty issues with a pretensioner that takes up the slack or sagging cable.

With the difference of height of the tailgate, one side of the tension cables is tight while the other side includes slack. Beside from the aesthetics, one side having slack means that it would not support any load in the tailgate system until it is tensioned. The force imparted into the tailgate system, from the user, stepping on the tailgate or the like or too much larger loads, could deflect the tailgate unevenly until both tension cables support the load. Thus, this could lead to adverse effects to the tailgate.

Accordingly, previous designs have included slots in the terminal of the tension cable that would require the operator on the line to visually adjust the cable but only to a limited amount based on the slot length or no adjustment would be made and the vehicle would be set to a slack system. Thus, it requires the operator to set the cable in order to take up the tension. At best, it is only as good as the process will allow, meaning that the operator could make a mistake and not set it or set it incorrectly. However, when no adjustment is designed, the drawbacks were that all of the vehicles would be to some amount a left to right difference and depending upon the amount of the difference between the left and right stack, this causes slack in the cable. Accordingly, the present disclosures provides the art with a pretensioner to take up the slack.

The present disclosure provides the art with an inexpensive cable pretensioner that is easily positioned onto the vehicle. The present disclosure provides a cam feature that eliminates slack in the cable. The present disclosure enables the slack to be adjusted to match the side and tension and evenly distribute the load between both cables. Thus, there is no operator intervention and every vehicle is set properly compared to the prior art. The present disclosure enables the slack to be removed based on torquing of the fastener. Thus, the securing of the pretensioner provides for the removal of slack in the system.

SUMMARY

This section provides a general summary of the disclosure, and is not a comprehensive disclosure of its full scope or all of its features.

According to the first aspect of the disclosure, a tailgate cable pretensioner comprises a cable having two ends with at least one end having a terminal to secure it to the vehicle or the tailgate. The pretensioner is on the other end of the cable. The pretensioner includes a fastener to secure it to the vehicle or the tailgate. The pretensioner takes up cable slack when it is secured onto the vehicle or tailgate. The pretensioner includes a cam coupled with the fastener. The cam receives the end of the cable. Also, a clutch is coupled with the cam to prevent over torquing of the pretensioner. The cam includes a channel to guide the cable.

According to a second aspect of the disclosure, a vehicle with a tailgate cable pretensioner comprises a vehicle having a drop down tailgate. A tailgate cable pretensioner comprises a cable having two ends with at least one end having a terminal to secure it to the vehicle or the tailgate. The pretensioner is on the other end of the cable. The pretensioner includes a fastener to secure it onto the vehicle or the tailgate. The pretensioner takes up cable slack when it is secured onto the vehicle or tailgate. The pretensioner includes a cam coupled with the fastener. The cam receives the end of the cable. Also, a clutch is coupled with the cam to prevent over torquing of the pretensioner. The cam includes a channel to guide the cable.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
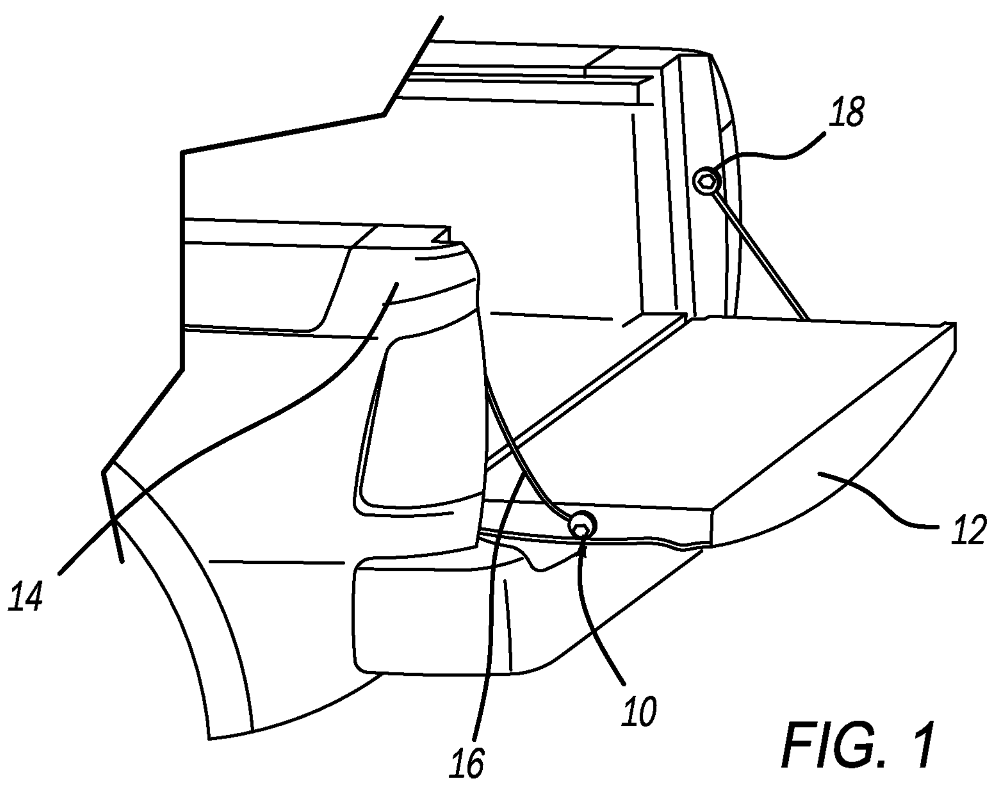
FIG. 1 is a perspective view of a cable pretensioner.
Figure 2:
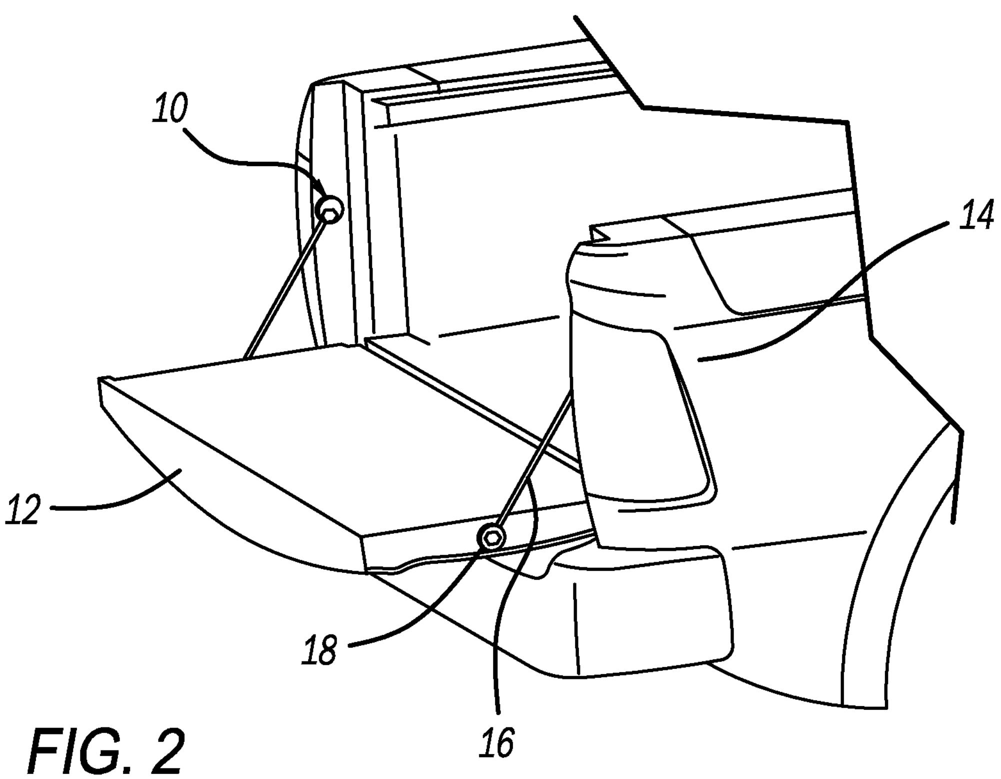
FIG. 2 is a view like FIG. 1 illustrating the pretensioner of the vehicle.

Turning to the figures, a tailgate truck cable pretensioner is illustrated and designated with the reference numeral 10. The pretensioner is secured to either the tailgate 12 or the vehicle box 14. The pretensioner 10 includes a fastener 20 with a cam 22. The cam 22 is rotated under torque until the tension in the cable matches the torque and thus sets the needed height or drop of the tailgate 12 taking the slack out of the cable 16. The cable 16 includes a terminal 18 that secures the cable to the other end to the other component, either the vehicle box 14 or the tailgate 12. The pretensioner 10 is either screwed into the tailgate 12, as illustrated in FIG. 1, or the vehicle body box 16 as illustrated in FIG. 2.

Figure 3:
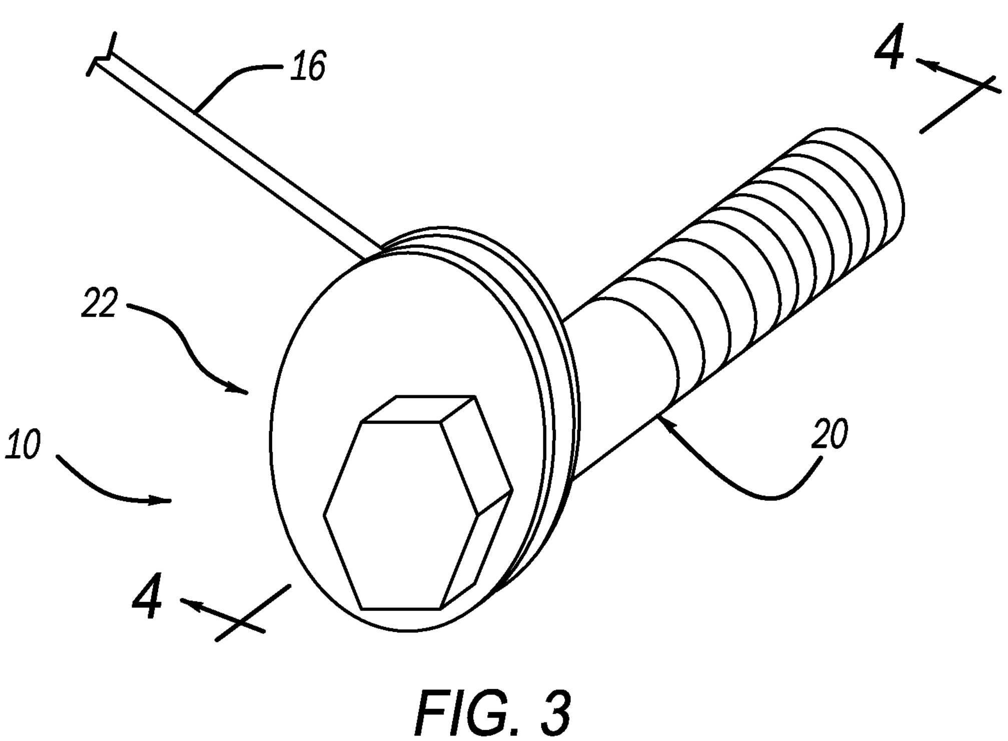
FIG. 3 is a perspective view of the pretensioning fastener.
Figure 4:
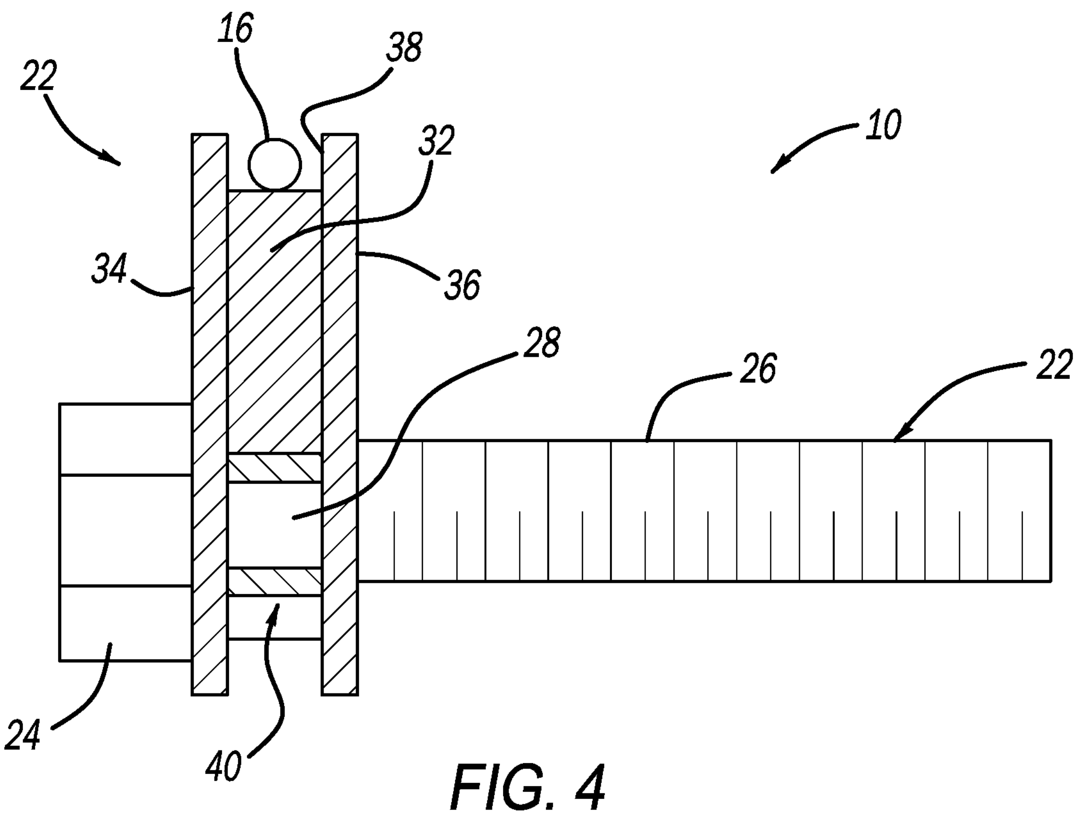
FIG. 4 is a cross-section view of FIG. 3.

Turning to FIGS. 3 and 4, the pretensioner 10 with the fastener 20 and cam 22 is illustrated. The fastener 22 includes a head 24, a shank 26, and a neck 28 between the shank and the head. The neck 28 has a smaller diameter portion than the shank 26. The shank 26 is threaded to enable it to be threaded into a nut on the vehicle 12 or tailgate 14. The reduced diameter neck 28 receives the cam 22 as illustrated in FIGS. 3 and 4.

The cam 22 is offset with respect to the fastener 22 and includes a body portion 32 flanked by plates 34, 36. The body 32 and plates 34, 36 define a channel 38 that receives the cable 16. The cable 16 is secured to the body 32 to enable the tensioning of the cable.

A clutch 40 surrounds the neck portion 28 within the cam 22. The clutch 40 prevents the over torquing of the fastener 22 and cable 18.

In use, the pretensioner fastener 20 is attached to the tailgate 12 or body 14. The cam 22 will rotate under torque until tension in the cable 18 matches the torque. Thus, this sets the needed height or drop of the tailgate 12 which, in turn, takes the slack out of the tensioning cable 18. The cam 22 can also be attached to the box side of the vehicle, as illustrated in FIG. 3, with the idea that the fastener 20 will be tightened and the slack as the other side with the adjustment working as described above. Both the tailgate 12 and box sides would not be needed in a typical vehicle build as it is generally understood that the adjustment would be done just once. The pretensioner 10 would also not be needed on both the right and left sides of the vehicle as only one side should be under tension and this would be needed to match only the other side that included the slack.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tailgate cable pretensioner comprising:

a cable having two ends with at least one end having a terminal for securing to a vehicle or a tailgate; and a pretensioner on the other end of the cable, the pretensioner including a fastener to secure the cable onto the vehicle or the tailgate, and the pretensioner taking up cable slack when the pretensioner is secured onto the vehicle or the tailgate, wherein the pretensioner includes a cam coupled with the fastener, the cam receiving the end of the cable, and wherein the a clutch is coupled with the cam for preventing over torque.

2. The tailgate cable pretensioner of claim 1, wherein the cam includes a channel for guiding the cable.

3. A vehicle with a tailgate cable pretensioner comprising:

a vehicle having a drop down tailgate;

a cable with two ends with at least one end having a terminal for securing to a vehicle or a tailgate; and a pretensioner on the other end of the cable, the pretensioner including a fastener to secure it to the vehicle or the tailgate, and the pretensioner taking up cable slack when the pretensioner is secured onto the vehicle or the tailgate, wherein the pretensioner includes a cam coupled with the fastener, the cam receiving the end of the cable, and wherein the cam includes a channel for guiding the cable.

4. The vehicle with a tailgate cable pretensioner of claim 3, further comprising a clutch coupled with the cam for preventing over torque.

* * * * *